(12) United States Patent
Kim (10) Patent No.: US 7,033,151 B2
(45) Date of Patent: Apr. 25, 2006

(54) CHECK VALVE OF SCROLL COMPRESSOR

(75) Inventor: Su-Chul Kim, Kyungsangnam-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/495,533

(22) PCT Filed: Jun. 18, 2002

(86) PCT No.: PCT/KR02/01146

§ 371 (c)(1),
(2), (4) Date: May 13, 2004

(87) PCT Pub. No.: WO03/042540

PCT Pub. Date: May 22, 2003

(65) Prior Publication Data

US 2005/0008521 A1 Jan. 13, 2005

(30) Foreign Application Priority Data

Nov. 16, 2001 (KR) .......................... 2001-71493 U (51) Int. Cl.
*F01C 1/02* (2006.01)
*F04C 18/00* (2006.01)

(52) U.S. Cl. ..................... 418/55.1; 418/185; 418/270; 137/856; 137/514.5

(58) Field of Classification Search ............... 418/55.1, 418/185, 270; 137/856, 514.5
See application file for complete search history.

(56) References Cited

U.S. PATENT DOCUMENTS

| 1,660,588 | A | * | 2/1928 | Wishart et al. | ............. | 137/856 |
| 3,799,427 | A | * | 3/1974 | Goglio | ........................ | 137/856 |
| 4,257,457 | A | * | 3/1981 | Namura et al. | ............. | 137/856 |
| 5,203,686 | A | * | 4/1993 | Scheldorf et al. | ........... | 418/270 |
| 6,565,339 | B1 | * | 5/2003 | Lee | ........................... | 418/55.1 |

FOREIGN PATENT DOCUMENTS

| JP | 57-073886 A | | 5/1982 |
| JP | 04279782 A | * | 10/1992 |
| JP | 05133352 A | * | 5/1993 |
| JP | 97-189944 A | | 7/1995 |
| JP | 11-166488 A | | 6/1999 |

* cited by examiner

*Primary Examiner*—Theresa Trieu
(74) *Attorney, Agent, or Firm*—Birch, Stewart, Kolasch & Birch, LLP

(57) ABSTRACT

A check valve of a scroll compressor which has a driving unit inserted in a casing and generating a driving force and a compression unit consisting of an orbiting scroll and fixed scroll for compressing and discharging fluid when the driving unit is driven, includes: a valve guide having one side fixed at an upper surface of the fixed scroll and having a certain space at an upper side of a discharge passage of the fixed scroll through which fluid is discharged, and a valve member with one side fixed at the upper surface of the fixed scroll, being slidably disposed in an horizontal direction at an inner surface of the valve guide, and performing an opening and closing operation on the discharge passage (34) by being slid in a horizontal direction of the valve guide.

10 Claims, 7 Drawing Sheets

FIG. 1

CONVENTIONAL ART

FIG. 2

CONVENTIONAL ART

FIG. 3

CONVENTIONAL ART

FIG. 9

CHECK VALVE OF SCROLL COMPRESSOR

TECHNICAL FIELD

The present invention relates a scroll compressor and, more particularly, to a check valve of a scroll compressor that is capable of reducing a noise generated when compressor fluid is discharged.

BACKGROUND ART

Generally, various types of compressors can be adopted according to a compression method, and a scroll compressor is mostly used for an air-conditioner which requires a small and light one.

Figure 1:
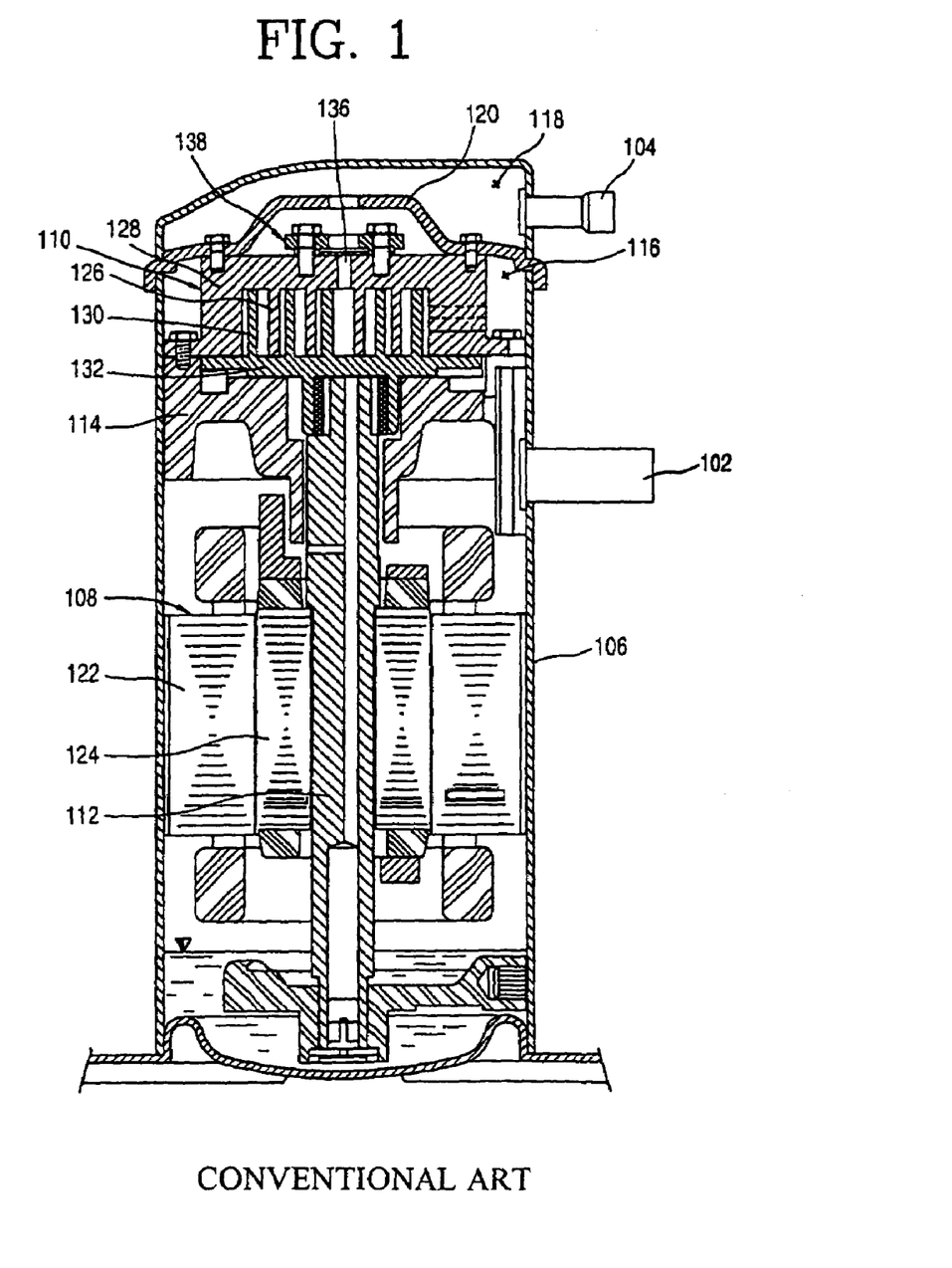
FIG. 1 is a sectional view of the scroll compressor in accordance with a conventional art.

FIG. 1 is a sectional view of a scroll compressor in accordance with a conventional art.

The conventional scroll compressor includes: a casing 106 having a suction pipe 102 for sucking fluid and a discharge pipe 104 for discharging compressed fluid, and having a closed space therein; a driving unit 108 disposed at a lower portion of the casing 106 and generating a driving force; and a compressing unit 110 disposed at an upper portion of the casing 106 and being connected to the driving unit 108 by a rotational shaft 112 to compress fluid.

Inside the casing 106, a main frame 114 is installed to rotatably support the rotational shaft 112 and also supports the compression unit 110, and a separating panel 120 is installed to divide the interior of the casing 106 into a low pressure chamber (first chamber) 116 and a high pressure chamber (second chamber) 118.

The driving unit 108 consists of a stator 122 fixed in a circumferential direction of the casing 106 and a rotor 124 disposed at an inner circumferential surface of the stator 122 and fixed at the rotational shaft 112. When power is applied to the stator 122, the rotor 124 is rotated according to an interaction of the stator 122 and the rotor 124, to thereby rotate the rotational shaft 112.

The compression unit 110 consists of a fixed scroll 128 having a fixed vane 126 in an involute shape and being fixed at the separating plate 120, and an orbiting scroll 132 having an orbiting vane 130 in an involute shape corresponding to the fixed vane 126 to have a certain compression space between itself and the fixed vane 126, being supported in an orbiting manner at the support panel 114, and making an orbiting movement when the rotational shaft 112 is rotated.

A discharge passage 136 is formed at the center of the fixed scroll 128 in order to discharge fluid compressed according to an interaction of the fixed scroll 128 and the orbiting scroll 132 to the second chamber 118, and a check valve 138 is installed at an upper side of the discharge passage 136 to prevent a backflow of the fluid to the first chamber 116 after being discharged to the second chamber 118.

Figure 2:
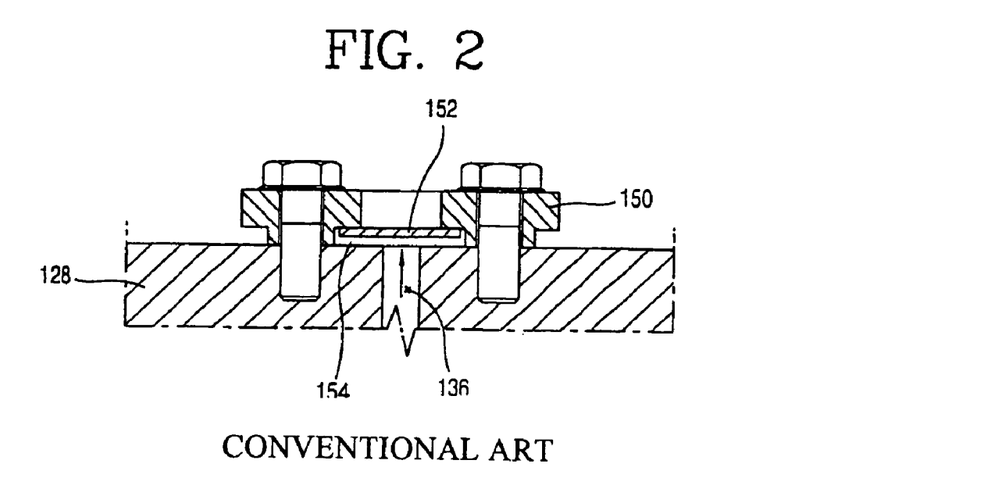
FIG. 2 is a sectional view showing a state that a check valve of the scroll compressor is opened in accordance with the conventional art.

As shown in FIG. 2, the check valve 138 consists of a valve guide 150 bolt-coupled to the central upper surface where the discharge passage 136 of the fixed scroll 128 is formed, and having a guide hole 154 communicating with the discharge passage 136, and a valve member 152 disposed movable in a vertical directional at the guide hole 154 of the valve guide 150.

The guide hole 154 of the valve guide 150 is a certain space in which the valve member 152 is moved in a vertical direction within a certain range, and is connected to the second chamber 118 so that fluid introduced into the discharge passage 136 can be discharged to the second chamber 118.

The valve member 152 is a platy valve inserted to be movable in a vertical direction within a certain range, and performs an opening and closing operation on the discharge passage 136 by a pressure difference between the second chamber 118 and the first chamber 116.

In the check valve of the conventional scroll compressor, as the rotational shaft 112 is rotated according to driving of the driving unit 108, the orbiting scroll 132 is orbited. Then, the fluid sucked through the suction pipe 102 is compressed and then discharged to the discharge passage 136. At this time, the valve member 152 is moved in the upward direction along the guide hole 152 by the discharge pressure of the fluid, opening the discharge passage 136. Then, the fluid compressed in the compression unit 110 is supplied to the second chamber 118 through the guide hole 154 and then outwardly discharged through the discharge pipe 104.

Figure 3:
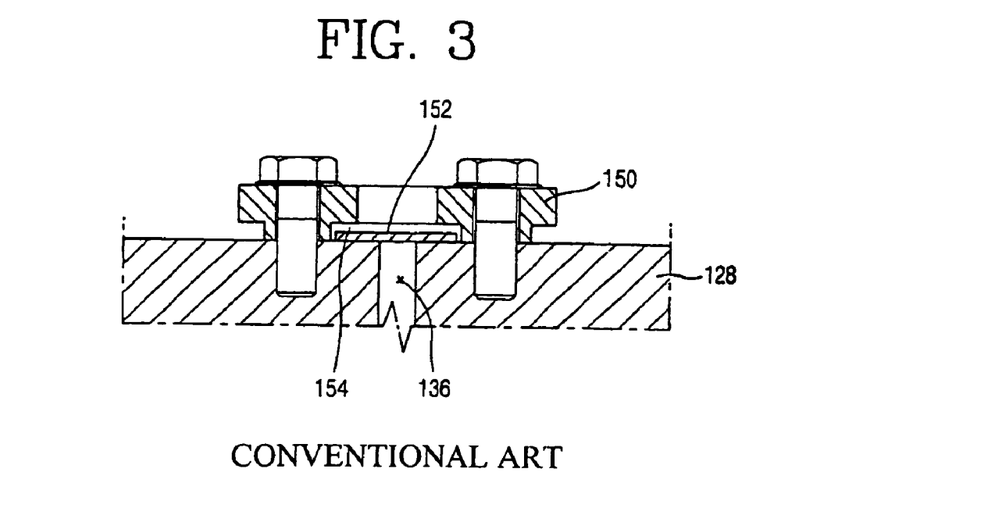
FIG. 3 is a sectional view showing a state that a check valve of the scroll compressor is closed in accordance with the conventional art

When the compressor is stopped from operation, the valve member 152 is moved in a downward direction along the guide hole 154 due to the pressure difference between the high pressure chamber 118 and the low pressure chamber 116, and closely adhered to the upper side of the discharge passage 136, so that a backflow of the fluid in the high pressure chamber 118 to the low pressure chamber 116 is prevented.

However, the check valve of the conventional scroll compressor has the following problem.

That is, when the discharge passage is opened, the check valve is moved in the upward direction along the guide hole to collide with the guide hole, and when the discharge passage is closed to prevent a backflow, the check valve collides with the upper side of the discharge passage as being moved in the downward direction along the guide hole, creating a noise.

Especially, as the valve collides with at a certain region according to an amount of the compressed fluid and an operation condition of the compressor, a noise is generated therefrom to cause a users' inconvenience.

TECHNICAL GIST OF THE PESENT INVENTION

Therefore, an object of the present invention is to provide a check valve of a scroll compressor that is capable of reducing a noise generated due to collision of a valve which is caused in a structure that an opening and closing operation of a check valve is slid in a horizontal direction.

DETAILED DESCRIPTION OF THE INVENTION

In order to achieve the above objects, there is provided a check valve of a scroll compressor having a driving unit inserted in a casing and generating a driving force and a compression unit consisting of an orbiting scroll and a fixed scroll for compressing and discharging fluid when the driving unit is driven, including: a valve guide having one side fixed at an upper surface of the fixed scroll and having a certain space at an upper side of a discharge passage of the fixed scroll through which fluid is discharged; and a valve member with one side fixed at the upper surface of the fixed scroll, being slidably disposed in a horizontal direction at an inner surface of the valve guide, and performing an opening and closing operation on the discharge passage 34 by being slid in a horizontal direction of the valve guide.

In the check valve of a scroll compressor in accordance with the present invention, the valve guide consists of an exhaust portion protruded in a semicircular shape in an upward direction of the discharge passage to form a space through which fluid is discharged; a fixed portion extended to one side of the exhaust portion and fixed at an upper surface of the fixed scroll; and a guide portion extended to the other side of the exhaust portion and guiding the valve member to be slid in a horizontal direction.

In the check valve of a scroll compressor in accordance with the present invention, the exhaust portion of the valve guide is formed in a semicircular shape in a horizontal direction and is platy so that its front side and the rear side are opened to discharge fluid.

In the check valve of a scroll compressor in accordance with the present invention, the fixed portion is extended from one side of the exhaust portion, both sides of which are formed bent with a certain width at a right angle in a downward direction so that one side of the valve member can be inserted thereinto, and has a through hole through which it can be bolt-coupled to a bolt recess formed at an upper surface of the fixed scroll.

In the check valve of a scroll compressor in accordance with the present invention, the guide portion of the valve guide is extended to the other side of the exhaust portion, of which both sides being in contact with an upper surface of the fixed scroll are formed bent with a certain height at a right angle in a downward direction in order to have a certain space in which the valve member is slid in a horizontal direction.

In the check valve of a scroll compressor in accordance with the present invention, the valve member consists of an opening and closing portion positioned inside the exhaust portion of the valve guide, and being tightly attached to an upper surface of the discharge passage and transformed by a pressure of the fluid so as to perform an opening and closing operation on the discharge passage; a fixed portion extended to one side of the opening and closing portion, and being inserted into the fixed portion of the valve guide so as to be fixed at an upper surface of the fixed scroll; and a sliding portion extended to the other side of the opening and closing portion and being slidably disposed inside the guide portion of the valve guide.

In the check valve of a scroll compressor in accordance with the present invention, the opening and closing portion of the valve member has a certain elastic force transformed by a pressure of fluid discharged to the discharge passage and formed in a disk type attached to the upper side of the discharge passage.

In the check valve of a scroll compressor in accordance with the present invention, the fixed portion has a through hole orresponding to the through hole of the valve guide and bolt-coupled to the upper surface of the fixed scroll.

In the check valve of a scroll compressor in accordance with the present invention, the sliding portion is formed to be platy and slidably inserted in a horizontal direction into the valve guide.

In the check valve of a scroll compressor in accordance with the present invention, the sliding portion is formed such that it maintains a space by about 1 mm with respect to the height of the inner space of the guide portion and it maintains an interval of about 0.1 mm with respect to the left and right sides of the guide portion.

In the check valve of a scroll compressor in accordance with the present invention, the valve member is formed in a thin plate type so as to be transformed when a certain pressure is applied thereto and made of a material with a certain elastic force so as to be restored to its original state when the pressure is removed after being transformed.

MODE FOR CARRYING OUT THE PREFERRED EMBODIMENTS

The present invention will now be described with reference to accompanying drawings.

There may be a plurality of embodiment of the scroll compressor in accordance with the present invention, of which most preferred one will now be described.

Figure 4:
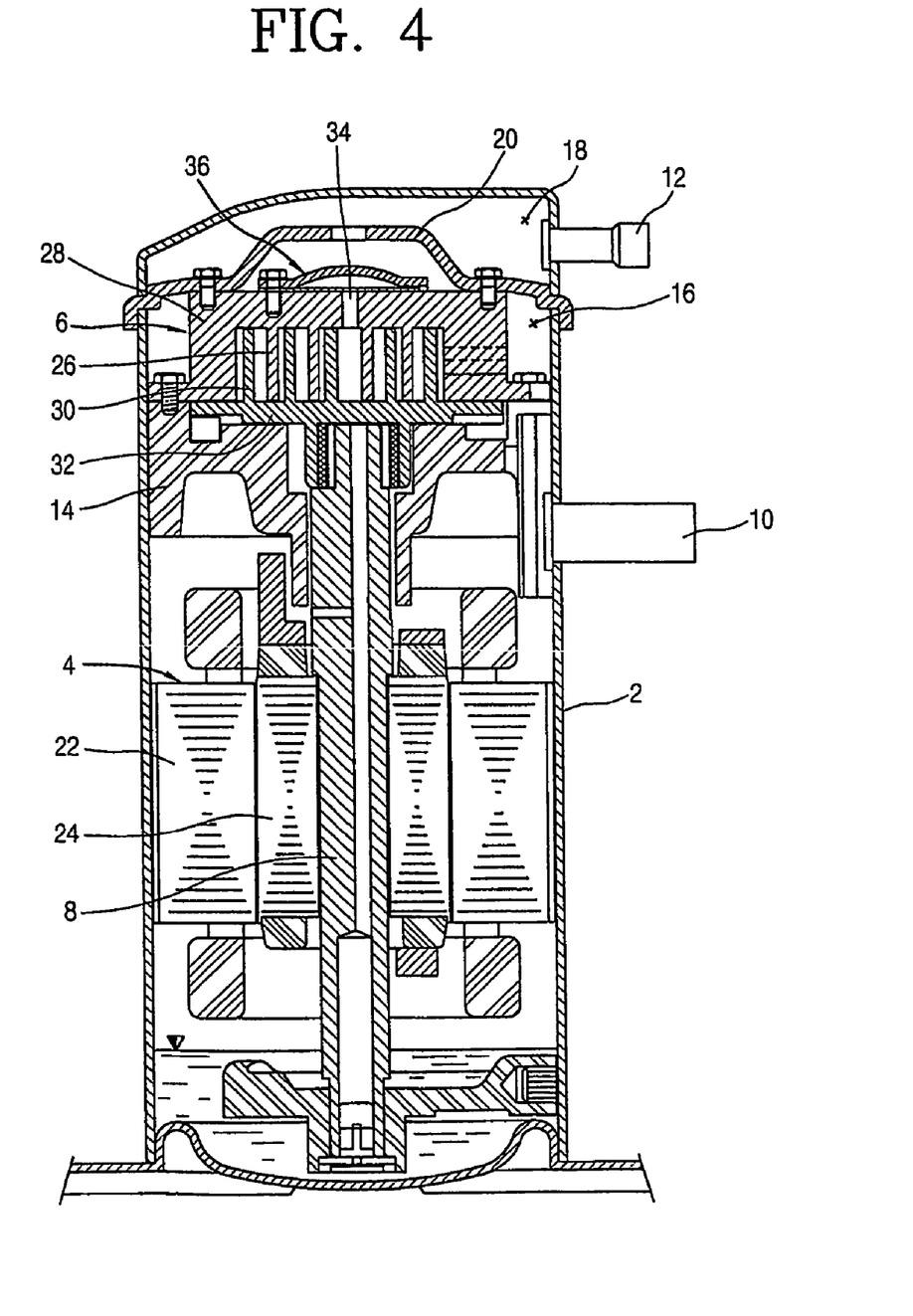
FIG. 4 is a sectional view of a scroll compressor in accordance with the present invention.

FIG. 4 is a sectional view of a scroll compressor in accordance with the present invention.

The scroll compressor in accordance with the present invention includes: a casing 2 having a closed space; a driving unit 4 inserted in the casing 2 and generating a driving force; a compression unit 6 connected to the driving unit 4 by a rotational shaft 8 and compressing and discharging fluid when the driving unit 4 is driven; and a check valve 36 installed at one side of the compression unit 6 and preventing a backflow of fluid.

A suction pipe 10 for sucking fluid and a discharge pipe 12 for discharging compressed fluid are connected to one side of the casing 2. Inside the casing 2, a main frame 14 is installed to rotatably support the rotational shaft 8 and support the compression unit 6, and a separating panel 20 is installed to divide the interior of the casing 2 into a low pressure chamber 16 and a high pressure chamber 18.

The driving unit 4 consists of a stator 22 fixed at an inner circumferential surface of the casing 2 and a rotor 24 disposed at an inner circumferential surface of the stator 22 and fixed at the rotational shaft 8, according to which when power is applied to the stator 22, the rotor 24 is rotated by the interaction of the stator 22 and the rotor 24, thereby rotating the rotational shaft 8.

The compression unit 6 includes a fixed scroll 28 having a fixed vane 26 in an involute shape and fixed at the separating plate 20, and an orbiting scroll 32 having an orbiting vane 30 in an involute shape corresponding to the fixed vane 26 to have a certain compression space therebetween and being supported in an orbiting manner at the support panel 14 so as to make an orbiting movement when the rotational shaft 8 is rotated.

The discharge passage 34 is formed at the center of the fixed scroll 28, through which a fluid compressed by the orbiting movement of the orbiting scroll is discharged to the high pressure chamber 18, and a check valve 36 is installed at an upper side of the discharge hole 34 to prevent a backflow of the fluid to the low pressure chamber after being discharged to the high pressure chamber.

Figure 5:
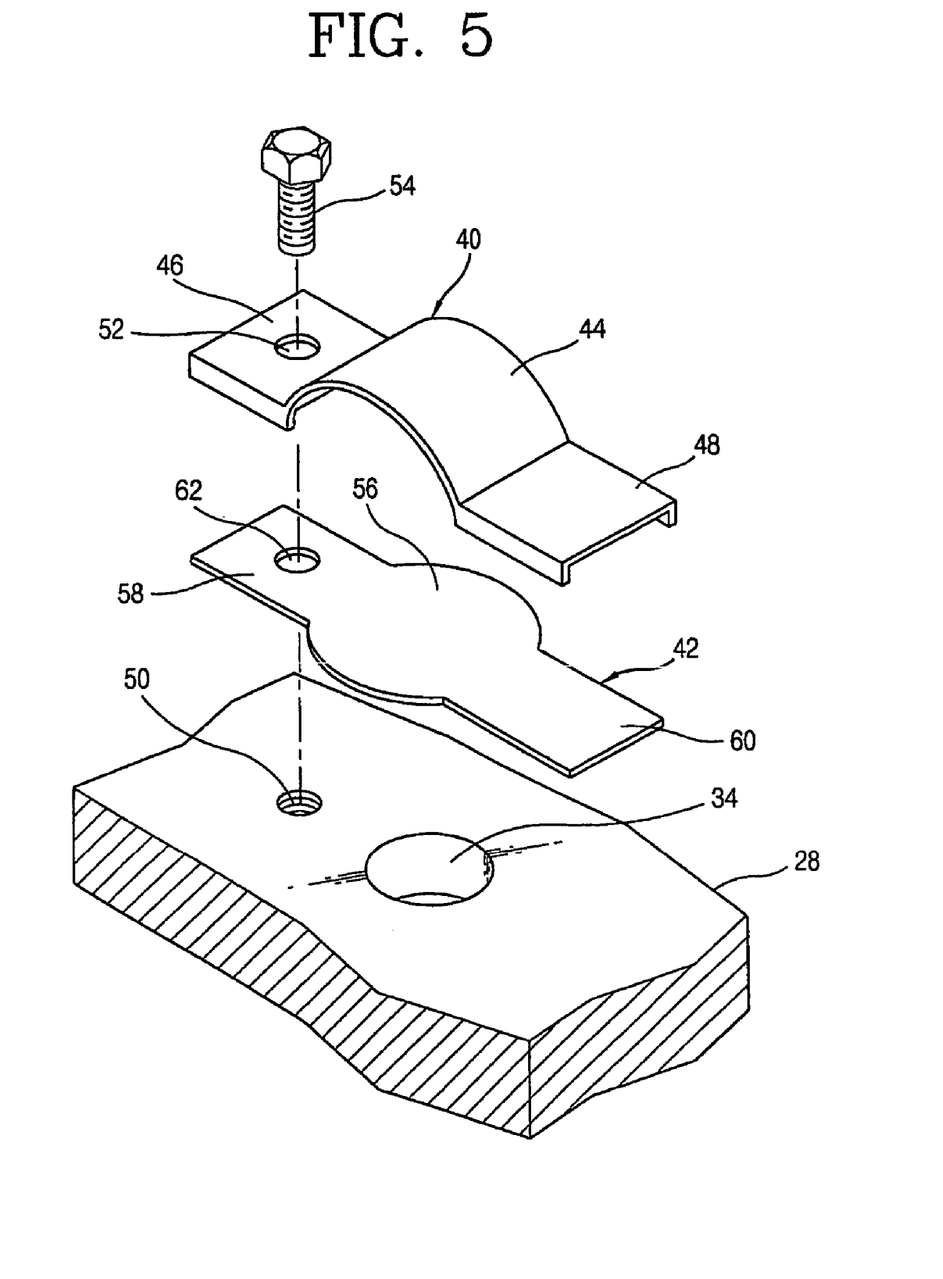
FIG. 5 is an exploded perspective view of a check valve of the scroll compressor in accordance with the present invention.
Figure 6:
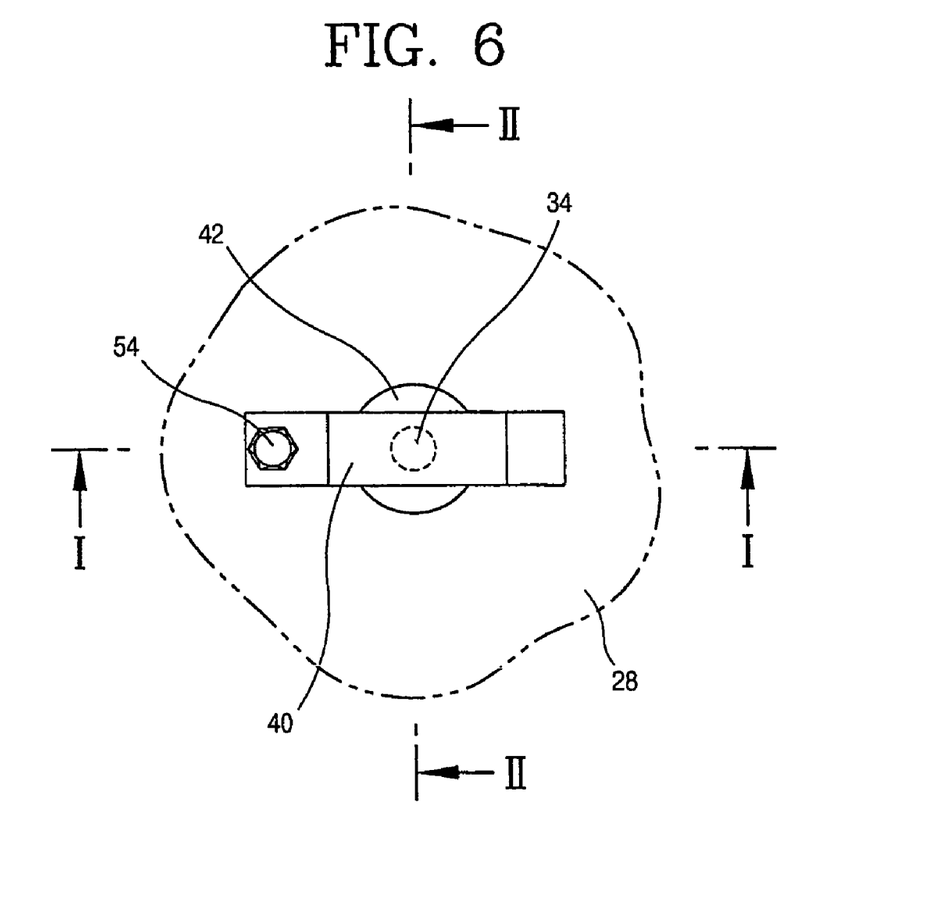
FIG. 6 is a upper side view of the check valve of the scroll compressor in accordance with the present invention.
Figure 7:
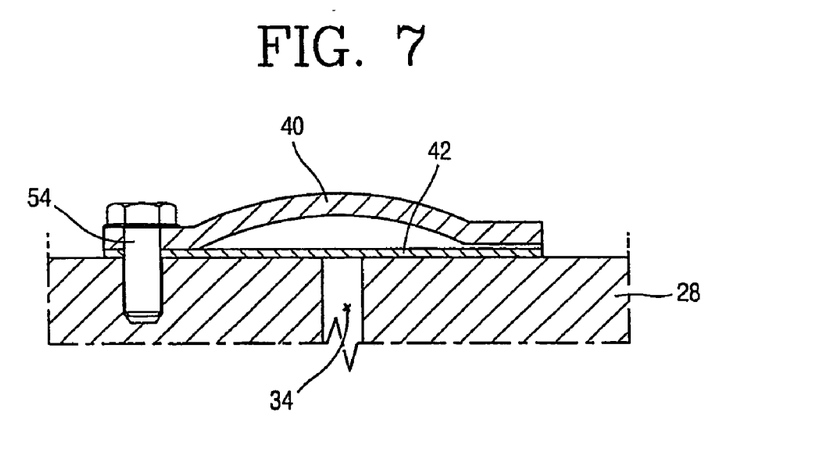
FIG. 7 is a sectional view taken along line I—I of FIG. 6.
Figure 8:
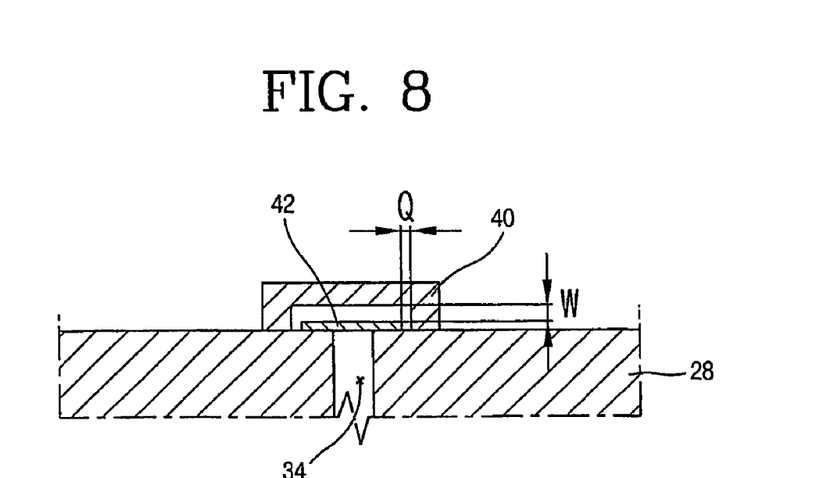
FIG. 8 is a sectional view taken along line III—III of FIG. 6.

FIG. 5 is an exploded perspective view of a check valve of the scroll compressor in accordance with the present invention, FIG. 6 is a upper side view of the check valve of the scroll compressor in accordance with the present invention, FIG. 7 and FIG. 8 are sectional views of the check valve of the scroll compressor in accordance with the present invention.

The check valve 36 includes a valve guide 40, one side of which is fixed at an upper surface where the discharge passage 34 of the fixed scroll 28 is formed, and having a certain space at its inner side, and a valve member 42 positioned to be slidable in a left/right direction at an inner circumferential surface of the valve guide 40, one side of which is fixed at an upper surface of the fixed scroll 28 where the discharge passage 34 is formed in order to open and close the discharge passage 34 while being slid in the left/right direction from the inner circumferential surface of the valve guide 40.

The valve guide 40 consists of an exhaust portion 44, a central portion, positioned at an upper side of the discharge passage 34 and formed convex in a semicircular shape in an upward direction to make a space for discharge the fluid, a fixed portion 46 extended from one side of the exhaust portion 44 and fixed at an upper surface of the fixed scroll 28, and a guide portion 48 extended from the other side of the exhaust portion 44 and guiding the valve member 42 so as to be slid in a left/right direction.

The exhaust portion 44 makes a semicircular shape in a horizontal direction, and its front side and rear side are formed flat and opened to discharge the fluid, according to which when the discharge passage 34 is opened, the valve member 42 is tightly attached to its inner surface to limit an opening degree of the valve member 42.

The fixed portion 46 is extended from one side of the exhaust portion 44, bent with a certain width downwardly at both sides thereof to obtain a space for one side of the valve member 42 to be inserted thereinto and has a through hole 52 so that the fixed portion 46 is coupled to the fixed scroll 28 as the through hole 52 and the bolt recess 50 are coupled by the bolt 54.

The guide portion 48 is extended from the other side of the exhaust portion 44, and bent at both sides which are in contact with the upper surface of the fixed scroll 28 at a right angle downwardly in order to have a certain space for the valve member 42 to be slid in a left/right direction.

The valve member 42 is formed with a thin plate type which is transformed with a certain pressure applied thereto, and made of a material with a certain elastic force so as to be recovered to its original state when the pressure is moved after transformation.

The valve member 42 includes an opening and closing portion 56 positioned at an inner side of the exhaust portion 44 of the valve guide 40 and tightly attached to the upper surface to the discharge passage 34 to open and close the discharge passage 34, a fixed portion 58 extended from the opening and closing portion 56 and inserted into the fixed portion 46 so as to be fixed at the upper surface of the fixed scroll 28, and a sliding portion 60 extended from the other side of the opening and closing portion 56 and slidably disposed inside the guide portion 48.

The opening and closing portion 56 has a certain elastic force so as to be transformed by a pressure of a fluid being discharged to the discharge passage 34 and is formed in a disk type tightly attached to the upper surface of the discharge passage 34. The fixed portion 58 includes a through hole 62 which corresponds to the through hole 52, so as to be coupled by the bolt 54.

The sliding portion 60 has a flat type and is slidably positioned in a left/right direction inside the guide portion 48 of the valve guide 40. For a smooth sliding in the guide portion 48, preferably, the sliding portion 60 is maintained with a space of about 1 mm with respect to the inner space height of the guide portion 48 and with a space of about 0.1 mm with respect to the left and right sides of the guide portion 48.

The operation of the scroll compressor in accordance with the present invention will now be described.

First, as shown in FIG. 7, when the compressor is stopped, the valve member 42 is tightly attached at the upper surface of the discharge passage 34 owing to the elastic force of the valve member 42 itself and a pressure difference between the high pressure chamber 18 and the low pressure chamber 16, so that the fluid in the high pressure chamber 18 is prevented from flowing backwardly to the low pressure chamber 16.

In this state, when the compressor is driven, a driving force of the driving unit 4 is transferred to rotate the rotational shaft 8. Then, as the compression unit 6 is operated according to rotation of the rotational shaft 8, in which the fluid sucked through the suction pipe 10 is compressed and then discharged to the high pressure chamber 18 through the discharge passage 34 and outwardly discharged from the high pressure chamber 18 through the discharge pipe 12.

Figure 9:
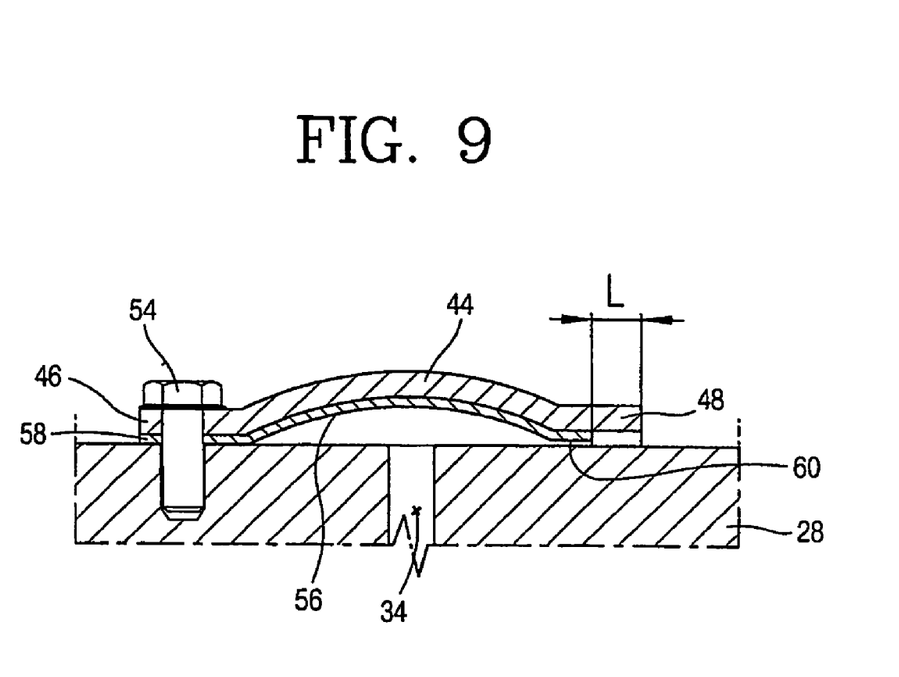
FIG. 9 shows an operation state of the scroll compressor in accordance with the present invention.

At this time, as shown in FIG. 9, as for the check valve 36, the opening and closing portion 56 of the valve member 42 is transformed in an upward direction owing to the pressure of the fluid being discharged to the discharge passage 34 and tightly attached to the inner surface of the exhaust portion 44 of the valve guide 40. Then, the discharge passage 34 is opened, through which the fluid is discharged in a front/rear direction of the exhaust portion 44 of the valve guide 40.

When the opening and closing portion 56 of the valve member 42 is transformed in an upward direction, the sliding portion 60 of the valve member 42 is moved as long as the distance (L) in the left direction in view of FIG. 9 along the guide portion 48 of the valve guide 40 as much as the opening and closing portion 56 is transformed upwardly.

At this time, the sliding portion 60 is maintained with the certain space with respect to the height of the guide portion 48 and with the certain space (Q) with respect to the side of the guide portion 48, so that the sliding portion 60 can be smoothly moved.

And when the compressor is stopped, the opening and closing portion 56 is recovered to its original state thanks to the elastic force of the valve member 42 itself and the pressure difference between the high pressure chamber 18 and the low pressure chamber 16 and moved in a downward direction so as to be tightly attached to the upper surface of the discharge passage 34, thereby preventing a backflow of the fluid. At this time, the sliding portion 60 is moved in the right direction in view of FIG. 9 along the guide portion 48 and recovered to its original state.

INDUSTRIAL APPLICABILITY

As so far described, the check valve of the scroll compressor in accordance with the present invention has the following advantages.

That is, when the valve member is transformed by the pressure of the fluid being discharged to the discharge passage to open the discharge passage, the valve member is slid in the left/right direction inside the valve guide. Therefore, when the valve member is opened and closed, it does not collide directly with other parts, so that a noise can be reduced when the valve is opened and closed.

The invention claimed is:

1. A check valve of a scroll compressor having a driving unit inserted in a casing and generating a driving force, and a compression unit including an orbiting scroll and a fixed scroll for compressing and discharging fluid when the driving unit is driven, comprising:

a valve guide having one side fixed at an upper surface of the fixed scroll and having a certain space at an upper side of a discharge passage of the fixed scroll through which fluid is discharged; and a valve member with one side fixed at the upper surface of the fixed scroll, being slidably disposed in a horizontal direction at an inner surface of the valve guide, and performing an opening and closing operation on the discharge passage by being slid in a horizontal direction of the valve guide, wherein the valve guide comprises:

an exhaust portion protruded in a semicircular shape in an upward direction of the discharge passage to form a space through which fluid is discharged;

a fixed portion extended to one side of the exhaust portion and fixed at an upper surface of the fixed scroll; and a guide portion extended to the other side of the exhaust portion and guiding the valve member to be slid in a horizontal direction.

2. The check valve of claim 1, wherein the exhaust portion of the valve guide is formed in a semicircular shape in a horizontal direction and is flat so that its front side and the rear side are opened to discharge fluid.

3. The check valve of claim 1, wherein the fixed portion is extended from one side of the exhaust portion, both sides of which are formed bent with a certain width at a right angle in a downward direction so that one side of the valve member can be inserted therein, and has a through hole through which it can be coupled to a bolt recess formed at an upper surface of the fixed scroll.

4. The check valve of claim 1, wherein the guide portion of the valve guide is extended to the other side of the exhaust portion, of which both sides being in contact with an upper surface of the fixed scroll are formed bent with a certain height at a right angle in a downward direction in order to have a certain space in which the valve member is slid in a horizontal direction.

5. A check valve of a scroll compressor having a driving unit inserted in a casing and generating a driving force, and a compression unit including of an orbiting scroll and a fixed scroll for compressing and discharging fluid when the driving unit is driven, comprising:

a valve guide having one side fixed at an upper surface of the fixed scroll and having a certain space at an upper side of a discharge passage of the fixed scroll through which fluid is discharged; and a valve member with one side fixed at the upper surface of the fixed scroll, being slidably disposed in a horizontal direction at an inner surface of the valve guide, and performing an opening and closing operation on the discharge passage by being slid in a horizontal direction of the valve guide, wherein the valve member comprises:

an opening and closing portion positioned inside the exhaust portion of the valve guide, and being tightly attached to an upper surface of the discharge passage and transformed by a pressure of the fluid so as to perform an opening and closing operation on the discharge passage;

a fixed portion extended to one side of the opening and closing portion, and being inserted into the fixed portion of the valve guide so as to be fixed at an upper surface of the fixed scroll; and a sliding portion extended to the other side of the opening and closing portion and being slidably disposed inside the a guide portion of the valve guide.

6. The check valve of claim 5, wherein the opening and closing portion of the valve member has a certain elastic force transformed by a pressure of fluid discharged to the discharge passage and formed in a disk type tightly attached to the upper side of the discharge passage.

7. The check valve of claim 5, wherein the fixed portion has a through hole corresponding to the through hole of the valve guide and bolt-coupled to the upper surface of the fixed scroll.

8. The check valve of claim 5, wherein the sliding portion is formed to be flat and slidably inserted in a horizontal direction into the valve guide.

9. The check valve of claim 5, wherein the sliding portion is formed such that it maintains a space by about 1 mm with respect to the height of the inner space of the guide portion and it maintains an interval of about 0.1 mm with respect to the left and right sides of the guide portion.

10. The check valve of claim 5, wherein the valve member is formed in a thin plate type so as to be transformed when a certain pressure is applied thereto and made of a material with a certain elastic force so as to be restored to its original state when the pressure is removed after being transformed.

* * * * *